Aug. 25, 1936.  A. C. ACCETTA  2,051,978
ARTIFICIAL LURE
Filed June 18, 1934
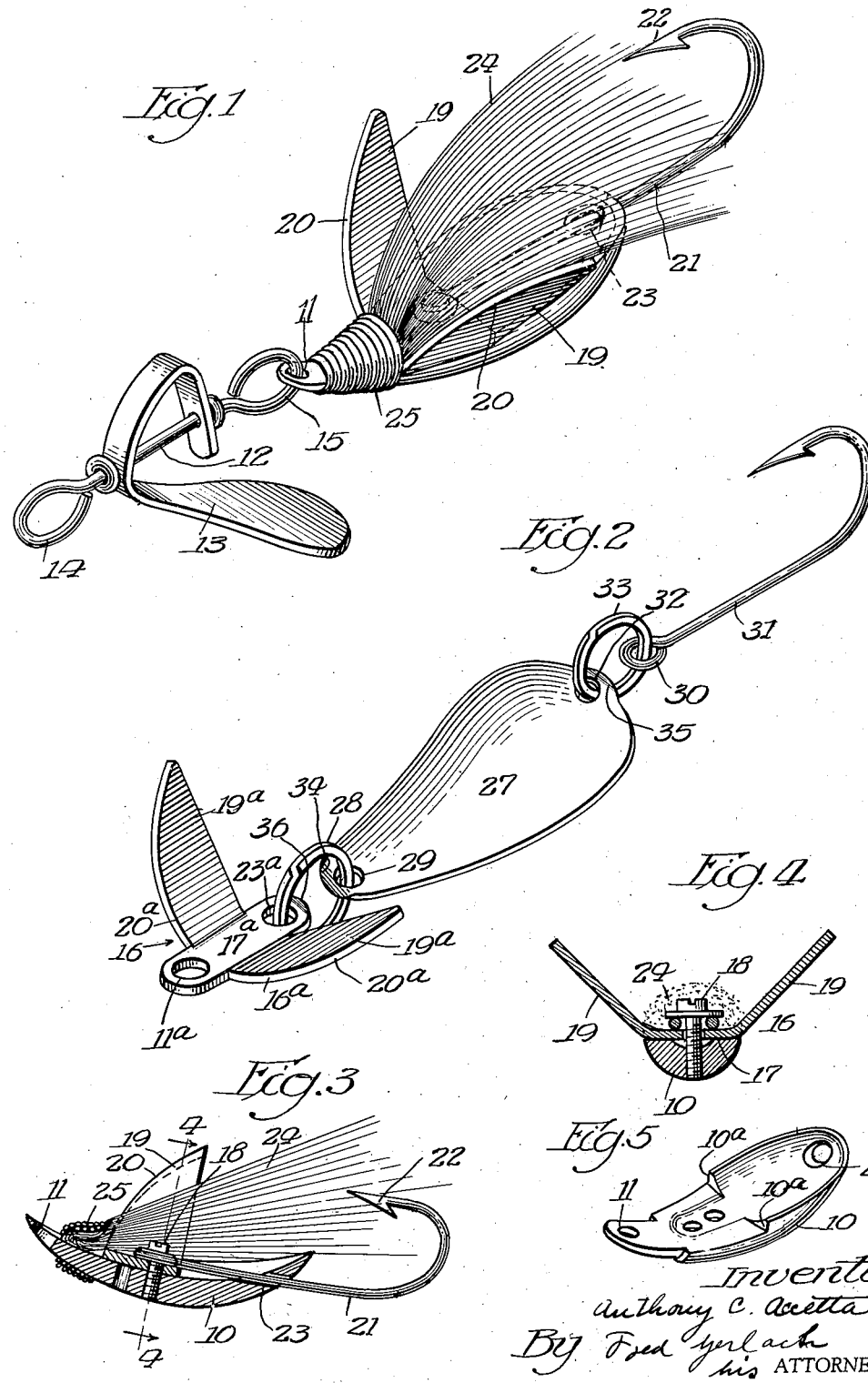
Inventor
Anthony C. Accetta
By Fred Gerlach
his ATTORNEY.

Patented Aug. 25, 1936

2,051,978

UNITED STATES PATENT OFFICE 2,051,978

ARTIFICIAL LURE

Anthony C. Accetta, Cleveland, Ohio

Application June 18, 1934, Serial No. 731,019.

5 Claims. (Cl. 43—42)

The invention relates to fish lures.

The main objects of the invention are: to provide an improved lure which has substantially rigid wing-like members to cause it to glide or sail through the air when it is cast; to provide an improved artificial lure which comprises a member formed of a plate with substantially rigid wings which serve to deflect weeds from the hook; and to provide an improved lure in which a fibrous member is disposed between the wing-like members. Other objects of the invention will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Fig. 1 is a perspective of a lure embodying one form of the invention;

Fig. 2 is a perspective illustrating a lure embodying another form of the invention;

Fig. 3 is a central longitudinal section through the lure of Fig. 1;

Fig. 4 is a transverse section on the line 4—4 of Fig. 3; and

Fig. 5 is a detail perspective of the body of the lure of Figs. 1, 3 and 4.

A lure which is shown in Figs. 1, 3, 4 and 5 comprises a solid body 10, the lower face of which is convexed longitudinally and laterally. The front end of the body 10 terminates in a narrow ear which is provided with a vertical hole 11. A spinner comprising a rod 12, a rotatable blade 13, a front eye 14, and a rear eye 15, serves as a connection between the body and a fishing line and is attached to the body by the eye 15 which extends through the hole 11 in the ear at the front end of the body. A plate 16 has a substantially rigid central portion 17 which is seated on a flat face on the top of the body 10 and against shoulders 10$^a$ for the sides of the top of the body. The plate 16 is removably secured in place by a screw 18. This screw serves to hold the plate rigidly on the body. The plate 16 at the sides of the body is extended upwardly and laterally to form upwardly divergent substantially rigid wings 19. The front edges 20 of the wings 19 are sloped or curved rearwardly to form deflecting surfaces for weeds and the like which may be encountered by the lure as it is drawn through the water. These dihedral wings cause the lure to glide or sail through the air when the lure is cast. A hook 21 with an upstanding barb 22 has its shank extended through a hole 23 in the upwardly curved rear portion of the body 10. The screw 18 which secures the plate 16 to the body extends through the eye of the hook, so that it serves removably to secure the plate and the hook to the body. A flexible member or bucktail 24 is secured to the body 10 by a wrapping 25 adjacent the front of the body immediately behind the hole 11, so that the fibres will spread rearwardly and upwardly between the wings 19 and in front of the barb of the hook to conceal the latter.

In this form of the invention the body 10 serves as a weight for stabilizing the movement of the bait in the water and in casting and the wings accelerate the movement of the lure through the air when it is cast and prevent its whirling during the cast. The wings 19 are of sufficient length so that they efficiently serve this purpose and also serve as weed deflectors for the hook.

The lure of Fig. 2 represents another form of the invention and is more particularly adapted for fishing when a very light lure is desired. In this form of the invention the line or spinner rod is connected to a hole 11$^a$ at the front end of a plate member 16$^a$. This plate member has a central transverse portion 17$^a$, upwardly and laterally extending wings 19$^a$ and a hole 23$^a$ at its rear end. The front edges 20$^a$ of the wings 19$^a$ are curved or sloped rearwardly. In this form of the invention the central portion of the plate 16$^a$ constitutes a body from which the wings project. A longitudinally and transversely concavo-convex spoon 27 is detachably connected to the plate 16$^a$ by a split ring 28 which passes through a hole 29 adjacent the front end of the spoon 27 and hole 23$^a$ in the rear end of the plate. A hook 31 is detachably connected to the spoon 27 by a split ring 33 which passes through a hole 32 adjacent the rear end of the spoon 27 and through the eye 30 of the hook 31. The spoon may be reversed from front to rear, if desired. In some instances it is not desired to use a spoon. The split rings 28 and 33 also permit the spoon to be removed and the hook 31 to be connected directly to the rear of the plate 16$^a$ by either of the split rings. The spoon 27 has its ends beveled as at 34 and 35 to serve as wedges for spreading the terminal of the wire forming the split ring when the spoon is to be connected thereto. These beveled ends also facilitate the passage of the spoon through the water. The rear end of the plate 16$^a$ is also beveled at 36 to serve as a wedge for spreading the split ring 28 in attaching it to the plate 16.

The lure is characterized by the fact that rigid dihedral wings cause it to glide or sail through the air without substantial rotation when it is cast and also cause it to land on the water right side up. It is also characterized in that the wings may be used with a solid or weighted body and fixed hook or with light tackle for fly fishing.

The invention is not to be understood as restricted to the particular details set forth since these may be modified within the scope of the appended claims without departing from the spirit and scope of the invention.

Having thus described the invention, what I regard as new and desire to secure by Letters Patent, is:

1. In an artificial lure, the combination of a member provided with means at its front end for connection to a line, a hook connected to the member, and a pair of flat, elongated wings projecting upwardly and outwardly in opposite directions and from the member and having rearwardly sloping front edges, and straight rear or trailing edges, said wings being more than twice as long as they are wide and being of sufficient area and length so that they serve to prevent spinning and cause the member to sail or glide through the air when the lure is cast.

2. In an artificial lure, the combination of a body provided with means at its front end for connection to a line, a hook, a plate having a transversely extending central portion and a pair of integral, laterally and upwardly extending wings, and a screw extending through the eye of the hook and the transverse portion of the plate for removably securing the plate and hook to the body.

3. In an artificial lure, the combination of a body provided with means at its front end for connection to a line, a hook connected to and extending rearwardly from the body, a plate secured to the body and provided with a pair of substantially rigid wings secured to and projecting upwardly and laterally from the body, and a rearwardly extending flexible member secured to the body in front of the plate and extending between the wings.

4. In an artificial lure, the combination of a plate having a hole at its rear end and also having a pair of substantially rigid and integral laterally and upwardly extending wings, means at its front end whereby the plate may be connected to a line, a spoon detachably connected to the hole in the plate, and means for detachably connecting a hook to the rear end of the spoon.

5. In an artificial lure, the combination of a body member having a hole at its rear end, means at its front end whereby the body member may be connected to a line, a spoon, a circumferentially split ring for detachably connecting the spoon to the hole in the body member, and a circumferentially split ring for detachably connecting a hook to the rear end of the spoon, said spoon having its front and rear ends beveled relatively to the upper edge of the intermediate portions of the body for spreading the split rings.

ANTHONY C. ACCETTA.